United States Patent [19]

Stadler et al.

[11] 4,455,973
[45] Jun. 26, 1984

[54] CYLINDER HEAD FOR A WATER-COOLED INTERNAL COMBUSTION ENGINE

[75] Inventors: Hans Stadler, Berg-Gladbach; Lothar Bauer; Wolfgang Strusch, both of Cologne, all of Fed. Rep. of Germany

[73] Assignee: Klöckner-Humboldt-Deutz Aktiengesellschaft, Cologne, Fed. Rep. of Germany

[21] Appl. No.: 472,739

[22] Filed: Mar. 7, 1983

[30] Foreign Application Priority Data

Mar. 9, 1982 [DE] Fed. Rep. of Germany ....... 3208341

[51] Int. Cl.³ .................................................. F01P 3/02
[52] U.S. Cl. ........................... 123/41.76; 123/41.82 R; 123/196 AB
[58] Field of Search .................. 123/41.82 R, 41.82 A, 123/41.76, 41.77, 41.78, 196 AB, 193 H

[56] References Cited

U.S. PATENT DOCUMENTS

| | | | |
|---|---|---|---|
| 2,493,532 | 1/1950 | Foden et al. | 123/41.76 |
| 2,788,776 | 4/1957 | Holt | 123/41.82 R |
| 3,889,644 | 6/1975 | Moore | 123/41.77 |
| 4,304,199 | 12/1981 | Formia et al. | 123/41.82 R |
| 4,418,655 | 12/1983 | Henning | 123/41.82 R |

*Primary Examiner*—William A. Cuchlinski, Jr.
*Attorney, Agent, or Firm*—Becker & Becker, Inc.

[57] ABSTRACT

A cylinder head, for a water cooled internal combustion engine, which reduces the thermal stresses. The gas-changing channels and the oil-return channels are located on one side. A main water overflow, in conjunction with an oppositely located auxiliary water overflow, makes possible a precise or directed flow along the valve land portion and around the turbulence chamber or the injection nozzle channel, whereby the flow is kept along the cylinder head bottom by a roof-shaped wall on the side remote from the cylinder block. The strength of the cylinder head is increased, and the oil removal is improved, by associating an oil-return channel with each cylinder. Specially shaped cylinder head screw channels increase the compression or pressure against the combustion chamber walls and effect a more uniform pressure distribution. A more favorable sealing behavior is attained by compensation or expansion curvatures in the cylinder head cover plate.

12 Claims, 6 Drawing Figures

CYLINDER HEAD FOR A WATER-COOLED INTERNAL COMBUSTION ENGINE

BACKGROUND OF THE INVENTION

The present invention relates to a cylinder head, in a unit construction, for several cylinders of a water-cooled internal combustion engine having indirect or direct injection; the cylinder head has at least two gas-changing channels per cylinder which are arranged on that side opposite to the turbulence chambers or injection nozzles.

Cylinder heads of the foregoing type are used for example with the "Rabbit" or "Golf" Diesel of Volkswagen. A problem of the presently employed cylinder heads, however, is the high thermal stressing in the region between the valves, i.e. the valve stems, and in the region of the turbulence chambers or injection nozzles, which high thermal stressing can lead to the formation of cracks at the mentioned locations. A further disadvantage with the conventional cylinder heads of this type of construction is a weakening of the cylinder-head-delimiting wall above the cylinder head gasket on one side due to placement of the intake and exhaust channels on this one cylinder head side. Furthermore, it is disadvantageous that the conventional cylinder heads have available only at most two oil-return channels, which are generally arranged on the two end faces of the cylinder head, as a result of which the oil removal and the oil exchange in the central region is unfavorably affected, which can lead to problems with valve stem seals on cylinder heads having overhead camshafts.

It is an object of the present invention to provide a water-cooled cylinder head of the foregoing general type which does not have the aforementioned disadvantages and which is suitable for mass production due to good casting capability. Additionally, the forces introduced to the cylinder head screws or bolts are to be better concentrated at the combustion chamber walls. The resilience or yield capability with a cylinder head having unit construction is to be increased for better adaptation to the cylinder block according to a further object of the present invention.

BRIEF DESCRIPTION OF THE DRAWINGS

These and other objects and advantages of the present invention will appear more clearly from the following specification in connection with the accompanying drawings, in which.

SUMMARY OF THE INVENTION

The cylinder head of the present invention is characterized primarily in that for each cylinder there is provided on the gas-changing channel side a main water overflow which produces a directed or precise flow along the valve land portion, i.e. that portion of the cylinder head bottom between the gas-changing channel, and through a water core which extends around the turbulence chamber or injection nozzle channel, said flow being introduced in cooperation with an auxiliary water overflow arranged laterally of the turbulence chamber or injection nozzle channel, and in cooperation with an opening provided between the cylinder-head-delimiting wall and the turbulence chamber or injection nozzle channel for connecting the water chamber on both sides of the turbulence chamber or injection nozzle channel; the water core is delimited in the region of the auxiliary water overflow by a roof-shaped wall on the side remote from the cylinder block, and the water core extends through the opening, which is arranged below the roof-shaped wall, preferably in the vicinity of the bottom plate of the cylinder head. The main water overflow is shaped like a nozzle, and is arranged in such a way that discharging water flow is directed parallel or substantially parallel to the bottom plate of the cylinder head precisely along the valve land. After passing the valve land, the cooling water flows through the opening and around the turbulence chamber or injection nozzle toward the auxiliary water overflow. A better cooling of the valve land as well as of the turbulence chamber or injection nozzle is obtained with the inventive design of the main water overflow, and with the arrangement of the main water overflow, the auxiliary water overflow, and the opening, and the thermal stressing of the cylinder head is reduced at these especially endangered locations.

The weakening of the cylinder-head-delimiting wall located above the cylinder head gasket, which weakening is a disadvantage with conventional cylinder heads and is caused by the placement of the intake and exhaust channels on one side of the cylinder head, is compensated for with the cylinder head according to the present invention thereby that each cylinder has its own oil-return channel which is constructed and dimensioned in such a way that it can take over a support function and can divert the gas forces which act on the cylinder head bottom toward the cylinder head screws or cylinder head screw channels. Moreover, due to the association of a respective oil-return channel with each cylinder, the return of the oil from the cylinder head to the crankcase, which oil is necessary for lubrication of the valve drive, is improved. This is especially important when valve-turning devices arranged under the valve springs are employed, since these devices cannot be permitted to stand in oil if they are to function satisfactorily. The improved return of oil is still further enhanced thereby that the intake channels extend into the valve-spring and tappet or valve stem chamber and subdivide the same into individual passages. As a result, the oil is returned funnel-like to the oil-return channels.

The oil supply of the valve drive of internal combustion engines having overhead camshafts is preferably effected via separate oil supply bores to or in the cast-on bearing blocks of the camshafts. Pursuant to one advantageous embodiment, the oil supply channel is branched in each camshaft bearing block in such a way that in addition to the camshaft bearing, at the same time the mechanical or hydraulic cup stems or tappets adjacent to the bearing block are supplied with oil via an annular groove provided therein.

To achieve a higher compression or pressure against the combustion chamber walls, and at the same time to obtain a more uniform pressure distribution, the cylinder head screw channels are widened conically in the direction toward the cylinder head bottom on the gas-changing side of the cylinder head, while on the injection side of the cylinder head the cylinder head screw channels have recesses at the cylinder head bottom. The cylinder head bottom plate is reinforced between the cylinders in the intermediate space or chamber, through which water flows, by a respective rib or a bead which increases uniformly on the cylinder head screw channels located opposite one another. In addition to the initially mentioned objects, a higher strength of the cylinder head in the transverse direction is also obtained by this measure.

Compensation or expansion curvatures, which extend transverse to the cylinder head and into the valve and tappet or stem space, are provided in the cylinder-head cover plate between individual cylinders according to the present invention to improve the adaptation of the cylinder head to the cylinder block, and hence to improve the sealing behavior. The bending resistance is reduced in the longitudinal direction of the block cylinder head by these expansion curvatures, thereby assuring a more favorable sealing behavior.

Openings can be provided in the region of the water chamber or space pursuant to a further embodiment of the cylinder head according to the present invention. Such openings, which are advantageous functionally or for casting reasons, for example for thermostat connection, for openings for core supports, or for cleaning openings, may be provided with edge beads which are constructed in such a way that they serve as abutments or supports for clamping shoes for fastening a nozzle holder. Special support elements are eliminated by this feature.

Pursuant to further specific embodiments of the present invention, a core having cooling water flowing therethrough may be delimited in the cylinder head on the injection side of the cylinder head above the opening by a preferably L-shaped, stepped cylinder-head-delimiting wall.

The intake channels may be steeply inclined to the cylinder-head-gasket plane in such a way that a space respectively results between a given intake channel and the corresponding substantially horizontal exhaust channel, with such space having a sufficiently dimensioned cross section for receiving a cast or bored oil-return channel.

The oil-return channel may be inclined, and may be connected tangentially to the exhaust channels, the entire surfaces of which, with the exception of the short tangential connection, have cooling water flowing therearound.

The oil-return channels connected to the exhaust channels may be connected with the main water overflows in such a way that they respectively form a unit which assumes support functions and diverts gas forces acting on the cylinder head bottom in the direction of the cylinder head screws or the cylinder head screw channels.

Intermediate spaces or chambers, through which water flows, may be provided on the one hand between the oil-return channels and the cylinder head screw channels, and on the other hand between the oil-return channels and the intake and exhaust gas elbow screw-on surface; the intermediate spaces may be supplied with cooling water via auxiliary water overflows arranged on the side of the main water overflows.

The steeply inclined intake channels may extend so far into the valve spring and tappet or stem chamber that they subdivide the latter into individual chambers.

DESCRIPTION OF A PREFERRED EMBODIMENT

Figure 1:
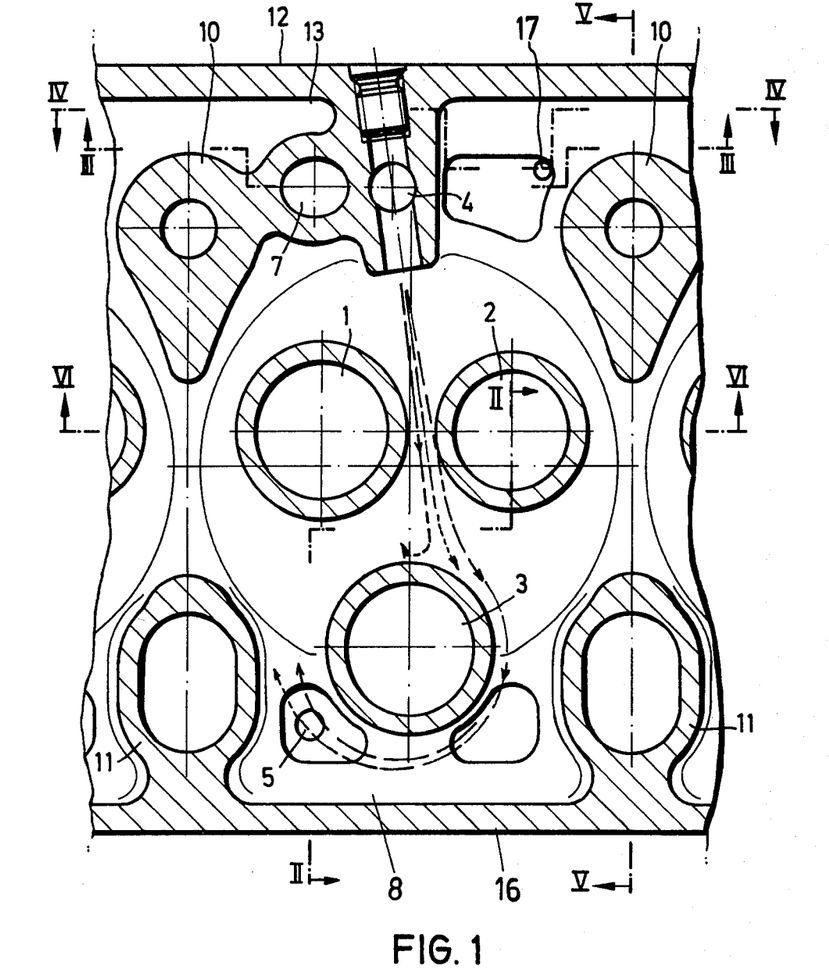
FIG. 1 is a fragmentary cross sectional view of one embodiment of a cylinder head according to the present invention taken along line I—I in FIG. 2.
Figure 2:
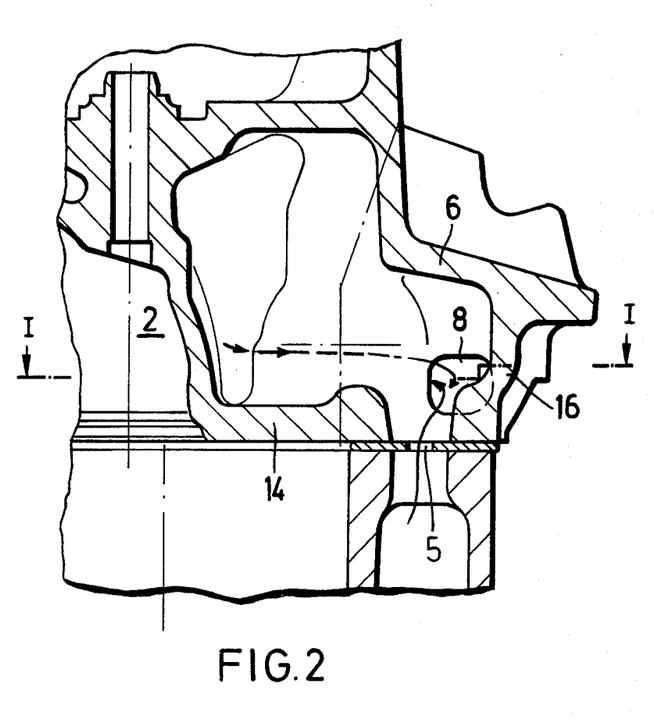
FIG. 2 is a fragmentary cross sectional view taken along line II—II in FIG. 1.
Figure 3:
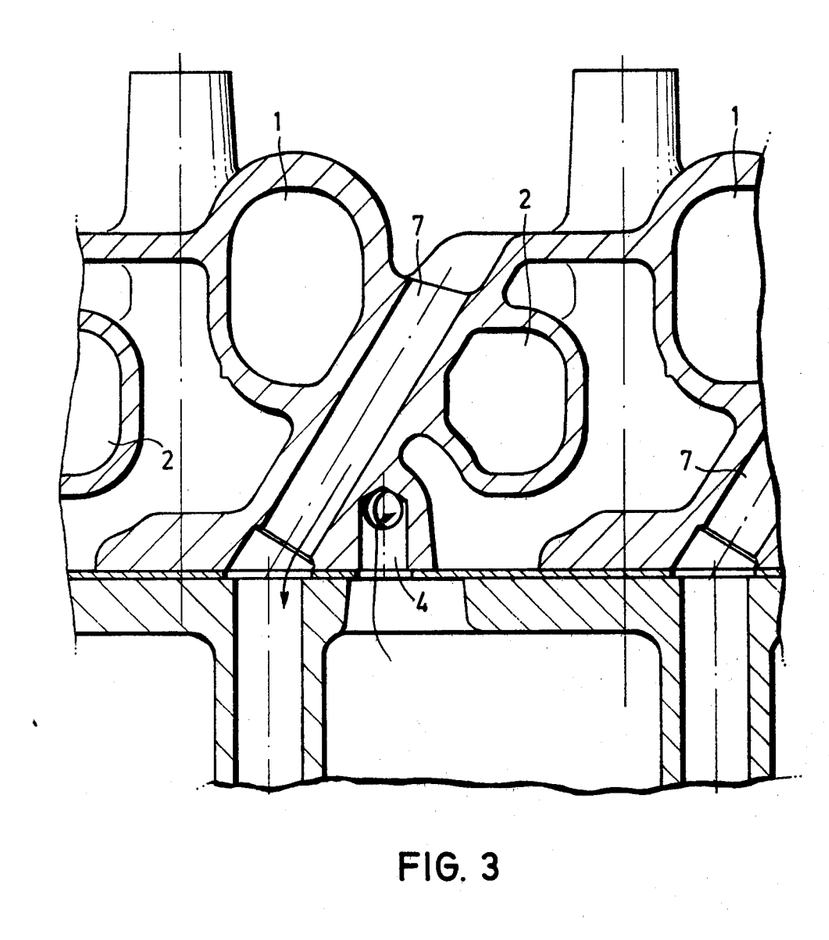
FIG. 3 is a fragmentary cross sectional view taken along line III—III in FIG. 1.

Referring now to the drawings in detail, shown are intake channels 1, exhaust channels 2, and turbulence chambers 3. Dash-line arrows represent the directed flow path from the main water overflow 4 to the auxiliary water overflow 5 or to the opening 8. FIGS. 1 and 3 clearly show the nozzle-like main water overflow 4, which produces the flow along the valve land between the gas-changing intake and exhaust channels 1 and 2, and around the turbulence chamber 3. As can be seen in FIG. 2, the main flow is kept along the cylinder head bottom 14 by means of a roof-shaped wall 6 in conjunction with the opening 8, which is preferably arranged on the cylinder head delimiting wall 16 approximately at the level of the bottom plate 14.

FIG. 3 shows the inclined arrangement of an oil-return channel or conduit 7, which is arranged between the nearly horizontally extending exhaust channel 2 and the intake channel 1, (which is at a steep incline to the cylinder-head-gasket plane), and which is connected with the main water overflow 4.

Figure 4:
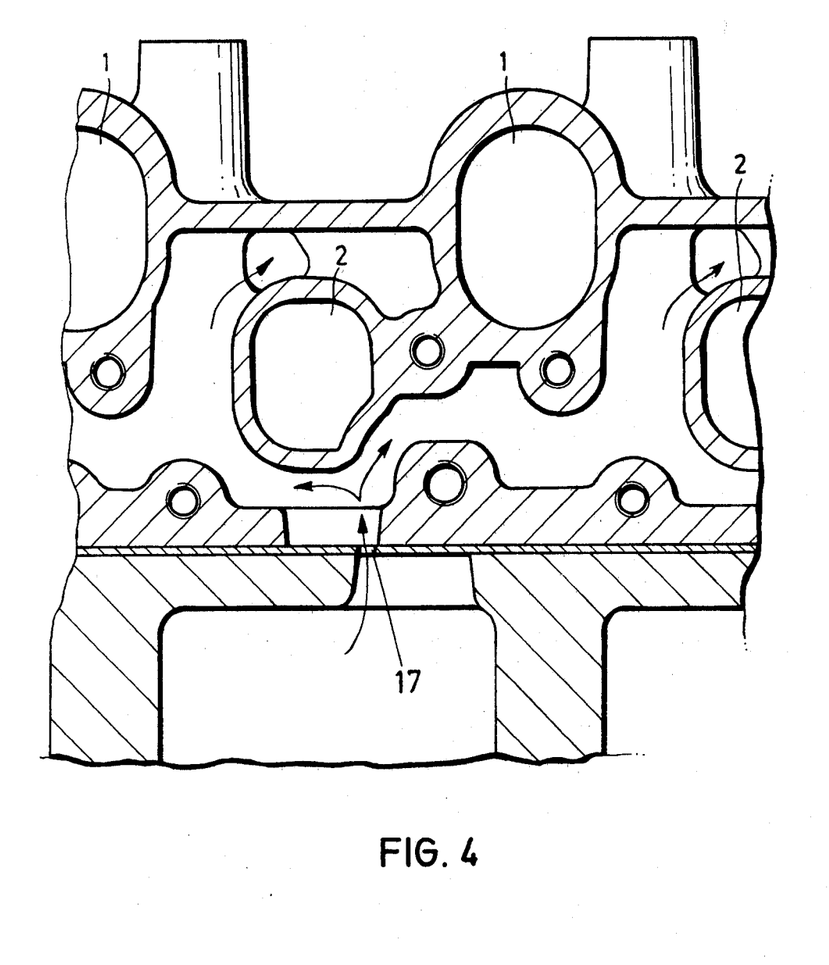
FIG. 4 is a fragmentary cross sectional view taken along line IV—IV in FIG. 1.

Even though the exhaust channels have cooling water circulating nearly completely therearound (see FIGS. 3 and 4), not only the oil-return channels 7 but also the cylinder head screw channels 10 are heated by the exhaust channels 2 due to the short connection to the oil-return channels 7. Since the intake securing or screw-on surface 12 should remain relatively cool to permit the installation or use of an intake elbow or bend of synthetic material, an intermediate chamber or space 13 through which water flows is provided between the intake elbow screw-on surface 12, and the cylinder head screw channels 10 or the oil-return channels 7. Auxiliary water overflows 17 are additionally arranged to the side of the main water overflow 4 for supplying the intermediate chamber 13 with cooling water.

Figure 5:
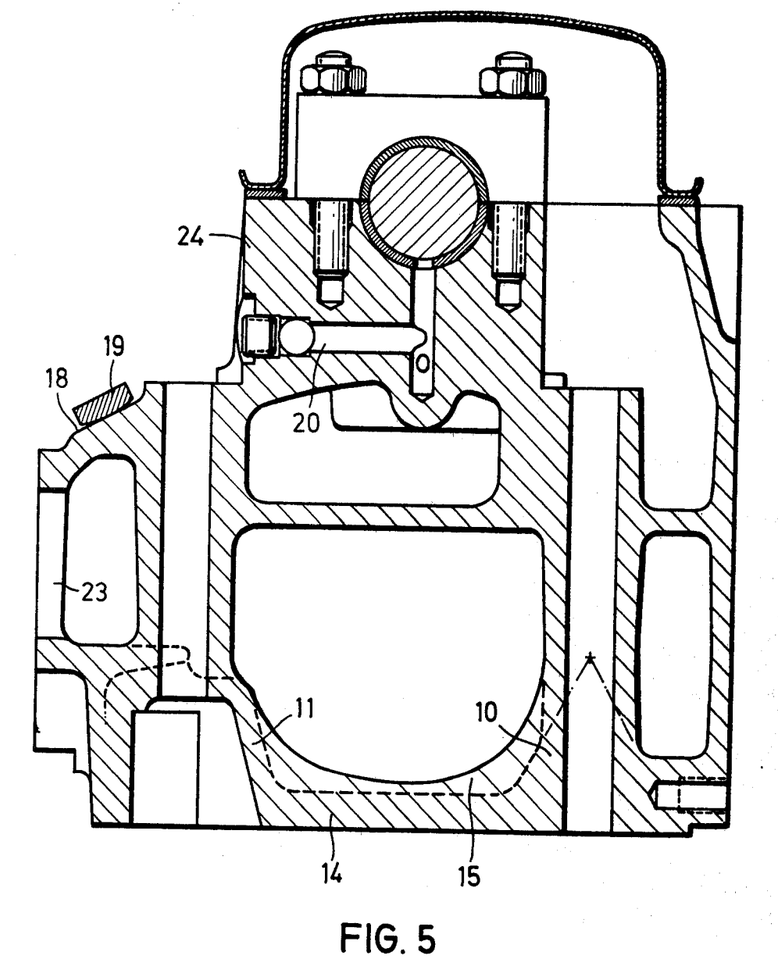
FIG. 5 is a cross sectional view taken along line V—V in FIG. 1.
Figure 6:
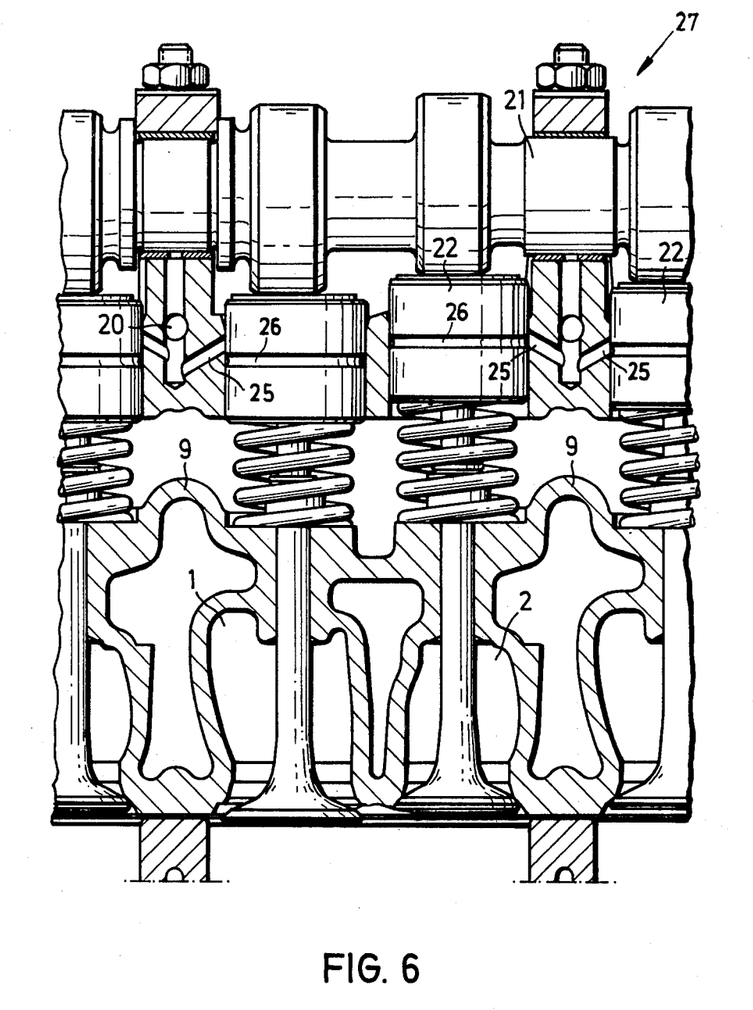
FIG. 6 is a fragmentary cross sectional view taken along line VI—VI in FIG. 1.

The cast-on bearing blocks 24 for the overhead camshaft 21 are illustrated in section in FIGS. 5 and 6. Not only are the camshaft bearings 27 supplied with lubricant via the oil supply bore 20, but also the cup tappets or stems 22 are supplied with lubricant via the branches 25 and the annular groove 26.

An opening 23 is also illustrated in FIG. 5, the edge bead 18 of which serves as a support for a clamping shoe 19 which serves to fasten a nozzle holder.

The cylinder head screw channels 10 and 11, which are specially designed according to the present invention for attaining a higher compression or pressure against the combustion chamber walls and for attaining a more uniform pressure distribution, are shown in FIGS. 1 and 5. The cylinder head screw channels 10, on the side of the gas-changing intake and exhaust channels 1 and 2, are conically widened in the water space or chamber in the direction of the cylinder head bottom 14, while the cylinder head screw channels 11 have recesses on the cylinder head bottom 14 on the injection side of the cylinder head. The cylinder head bottom plate 14 is reinforced in the water chamber between the cylinders by a respective rib 15 which rises uniformly on the cylinder head screw channels 10 and 11, which are located opposite one another.

FIG. 6 clearly shows the arrangement and construction of the compensation or expansion curvatures 9, which are provided for improving the sealing behavior of the cylinder head.

The cylinder head provided pursuant to the present invention is not as highly stressed thermally as are conventional cylinder heads due to the precise cooling of the critical locations. With the cylinder head according to the present invention, at the same capacity or power of the internal combustion engine, a longer life expectancy can therefore be anticipated, or, at the same life expectancy, an increase in capacity or power of the internal combustion engine can be anticipated.

Further advantages of the cylinder head according to the present invention exist in the higher compression or pressure against the combustion chamber walls, as well as in the more uniform pressure distribution and the better sealing behavior. Furthermore, the weakening of the cylinder-head-delimiting wall brought about by the arrangement of intake and exhaust channels on one cylinder head side is compensated for by the arrangement and design of the oil-return channels, whereby at the same time a better oil return is obtained from the cylinder head to the crankcase. Similarly, the lubrication of the valve mechanism is improved by the design of the oil supply bore 20. A good casting capability of the inventive cylinder head, as a precondition for mass production, is provided by structurally embodying the cylinder head of cast iron or of aluminum.

Although in the illustrated embodiment the inventive features are shown on a cylinder head which is part of a unit construction, these features can also be used on individual cylinder heads.

The present invention is, of course, in no way restricted to the specific disclosure of the specification and drawings, but also encompasses any modifications within the scope of the appended claims.

What we claim is:

1. A cylinder head for at least one of the cylinders in the cylinder block of a water-cooled internal combustion engine which is provided with direct or indirect injection, said cylinder head comprising:
   a bottom adapted to be placed on said cylinder block;
   first and second oppositely located delimiting walls which are respectively connected to said bottom of said cylinder head;
   a turbulence chamber associated with said injection and communicating through said cylinder head bottom with a given cylinder;
   at least two gas-changing channels for each cylinder for communicating through said cylinder head bottom with a given cylinder, said gas-changing channels being located between said turbulence chamber and said second delimiting wall, with a water chamber being provided around said gas-changing channels and said turbulence chamber;
   a valve land located between each two gas-changing channels as part of said bottom of said cylinder head;
   one nozzle-like main water overflow for each cylinder, said main water overflow being located between said gas-changing channels and said second delimiting wall, and communicating with said water chamber;
   an auxiliary water overflow located on that side of said gas-changing channels remote from said main water overflow; and
   an opening located between said first delimiting wall and said turbulence chamber for providing communication between said water chamber and said auxiliary water overflow; said main water overflow being adapted to provide in conjunction with said opening and said auxiliary water overflow a water flow which is directed toward said valve land and is at least substantially parallel to said bottom of said cylinder head.

2. A cylinder head according to claim 1, in which said opening is arranged directly next to said first delimiting wall approximately at the level of said cylinder head bottom.

3. A cylinder head according to claim 1, in which said water chamber is a core through which cooling water flows, said core being delimited in the vicinity of said turbulence chamber, and on that side of said opening remote from said cylinder head bottom, by said first delimiting wall, which is L-shaped and stepped in this vicinity.

4. A cylinder head according to claim 1, in which said gas-changing channels associated with a given cylinder include an exhaust channel which is nearly parallel to said cylinder head bottom, and an intake channel which extends at such a steep angle relative to said cylinder head bottom that a space results between said intake and exhaust channels which is of sufficient dimensions for receiving therein an oil-return channel.

5. A cylinder head according to claim 4, in which said oil-return channel extends at an angle relative to said cylinder head bottom and is tangentially connected at said exhaust channel; said oil-return channel extending through said water chamber, so that the entire outer surface of said oil-return channel, with the exception of the short tangential connection, has cooling water flowing therearound.

6. A cylinder head according to claim 5, which includes cylinder head screw channels in the vicinity of said second delimiting wall for receiving cylinder head screws; and in which said oil-return channel is connected with said main water overflow in such a way as to form a unit which assumes support functions and diverts gas forces acting on said cylinder head bottom in the direction of said cylinder head screw channels and screws.

7. A cylinder head according to claim 6, which includes intermediate chambers between said oil-return channel and said cylinder head screw channels, and between said oil-return channel and said second delimiting wall; and which includes a further auxiliary water overflow arranged in the vicinity of said main water overflow for supplying said intermediate chambers with cooling water.

8. A cylinder head according to claim 6, which includes further screw channels in the vicinity of said first delimiting wall for receiving further cylinder head screws, said further screw channels being provided with recesses at said cylinder head bottom, and said first screw channels being widened in said water chamber in the direction toward said cylinder head bottom; and which includes ribs for reinforcing said cylinder head bottom, said ribs being respectively disposed in said water chamber between cylinders, and rising uniformly from said cylinder head bottom on two oppositely located first and further screw channels.

9. A cylinder head according to claim 8, which includes openings in said first delimiting wall with which are associated an edge bead which serves as supports for clamping shoes for fastening a nozzle holder.

10. A cylinder head according to claim 5, which includes a valve spring and valve tappet or stem chamber, said steeply inclined intake channels extending into said last mentioned chamber to such an extent as to subdivide the latter into individual chambers.

11. A cylinder head according to claim 10, which includes, in said valve spring and valve tappet or stem chamber of a given cylinder, expansion cuvatures which extend in the direction between said first and second delimiting walls.

12. A cylinder head according to claim 5, which includes cast-on bearing blocks for an overhead camshaft, each bearing block including a separate oil supply bore connected to said oil-return channel for supplying adjacent valve tappets or stems with lubricating oil.

* * * * *